United States Patent [19]

Sasaoka et al.

[11] Patent Number: 5,532,008

[45] Date of Patent: Jul. 2, 1996

[54] FEEDSTUFF FOR RUMINANT

[75] Inventors: Seiji Sasaoka; Izuo Aoki, both of Ichihara; Hiroshi Maruyama, Niigata, all of Japan

[73] Assignee: Nippon Soda Co., Ltd., Tokyo, Japan

[21] Appl. No.: 424,029

[22] Filed: Apr. 18, 1995

Related U.S. Application Data

[63] Continuation-in-part of Ser. No. 73,025, Jun. 7, 1993, abandoned, which is a continuation-in-part of Ser. No. 4,355, Jan. 14, 1993, abandoned, which is a continuation of Ser. No. 768,251, Oct. 15, 1991, abandoned.

[51] Int. Cl.$^6$ ..................................................... A23K 1/18
[52] U.S. Cl. ........................... 426/73; 426/807; 426/72; 426/74; 426/2; 426/97; 426/98; 426/99; 426/601; 426/656
[58] Field of Search .................................. 426/72, 73, 74, 426/97, 98, 99, 601, 656, 807, 2

[56] References Cited

U.S. PATENT DOCUMENTS

| | | | |
|---|---|---|---|
| 3,959,493 | 5/1976 | Baalsrud et al. | 426/2 |
| 4,642,317 | 2/1987 | Palmquist | 514/558 |
| 4,826,694 | 5/1989 | McAskie | 426/74 |

OTHER PUBLICATIONS

Tsuchida, Japio Abstract 88-313546, Dec. 21, 1988—"Production of Feed Raw Material For Ruminant".
Sasaoka, Japio Abstract 2-163043 (A), Jun. 22, 1990—"Feed Additive For Ruminant".
Sasaoka, Japio Abstract 2-163044 (A), Jun. 22, 1990—"Feed Additive For Ruminant".

*Primary Examiner*—Donald E. Czaja
*Assistant Examiner*—Choon P. Koh
*Attorney, Agent, or Firm*—Joseph C. Mason, Jr.; George B. Oujevolk; Louise A. Foutch

[57] ABSTRACT

Ruminant feedstuffs comprising at least one biologically active substance such as amino acids, salts of amino acids and vitamins which are dispersed in a protectant containing calcium salts of mixed fatty acids as a main component wherein the void ratio is 15% or less and the moisture content is 2% by weight or less are disclosed. The feedstuff preparations of the present invention have excellent rumen bypassing properties and excellent digestion and absorption properties in the abamasum and subsequent digestive organs in addition to the feedstuffs' excellent heat resistant stability.

16 Claims, 5 Drawing Sheets

FEEDSTUFF FOR RUMINANT

This is a continuation-in-part of application Ser. No. 08/073,025 filed on Jun. 7, 1993, now abandoned which is Continuation-In-Part of then copending application Ser. No. 08/004,355, filed on Jan. 14, 1993, now abandoned, which is a Continuation of then copending application Ser. No. 07/768,251 filed on Oct. 15, 1991, now abandoned.

BACKGROUND OF THE INVENTION

1. Field of the Invention

The present invention relates to a feedstuff for ruminants. It particularly relates to a granular feedstuff for ruminants which contains a protective material in the form of a calcium salt of mixed fatty acids.

2. Description of Related Art

It is known that additive agents such as amino acids and vitamins have been added to ruminant feedstuff for oral administration due to the high efficient absorption of the amino acids and vitamins in the abomasum. The art has also developed techniques for bypassing the rumen with such additives.

Heretofore, in oral administration of the feed additives, it has been proposed that the additives be dispersed into protective materials. The protective materials are stable in the gastric juices of the rumen and easily broken down in the abomasum. Known protective materials include higher fatty acids, triglycerides of the fatty acids, fats and oils, and hardened animal and plant oils. Various types of preparations coated by protective materials are described in Japanese Patent Laid-open No. 154956/1981 and in Japanese Patent Laid-open No. 151133/1986.

The present inventors have heretofore proposed preparations wherein active substances such as chitosan as the additive are dispersed into protective materials or the additive is coated with the protective material. These prior preparations are described in Japanese Laid-open No. 175449/1983 and in Japanese Patent Laid-open No. 198946/1984 and marketed under the tradename LACTET®.

In addition, feedstuff preparations designed to bypass the rumen of ruminants are described in U.S. Pat. No. 4,826,694 and in U.S. Pat. No. 4,642,317. In general, these references describe preparations which comprise divalent metallic salts such as calcium or magnesium salts of fatty acids having 14, 16 and/or 18 carbon atoms.

Japanese Laid-open patent No. 313546/1988 describes a manufacturing method for preparing a feedstuff for ruminants wherein the protective material is a calcium salt of mixed fatty acids obtained from naturally occurring fat and oils. The additive substance is heated and softened at a temperature above its melting point. The resulting mixture is then solidified by cooling and then granulated.

It has been observed that the protective material prepared by known methods, when orally administered to ruminants, display excellent rumen bypass properties and excellent digestive/absorption properties in the abomasum. However, these same materials have poor storage stability above 40° C. due to the low softening point of the protective materials.

The poor heat stability properties of the feedstuff pellets was partially solved by using a protective material comprising metallic salts of mixed fatty acids having a softening point of at least 100° C. However, in the preparations described in the references, the active substance or additive cannot be sufficiently protected by a coating of the metallic salt of mixed fatty acids. The results were widely varying rumen bypass properties and consequently, these materials were insufficient for the intended purpose of oral administration of the active substances.

It is, therefore, an object of the present invention to provide a granular ruminant feedstuff in which the active substance is dispersed in or coated with a calcium salt of fatty acids and which has excellent heat stability, excellent rumen bypass properties and excellent digestive/absorption properties in the abomasum and intestines when orally administered to a ruminant.

SUMMARY OF THE INVENTION

The present inventors, as a result of intensive investigation conducted to achieve the above object, discovered that the rumen bypass properties of a feedstuff for ruminants containing a dispersion of active substances in a protective material comprising a calcium salt of mixed fatty acids depends greatly on control of the moisture content and void ratio of the granulated feedstuff, on the free calcium hydroxide content of the calcium salt being used, and on the crystallizability of the calcium salt. It was also discovered that the control of the moisture, the void ratio, and crystallizability properties can be obtained by the addition of a hydrophobic material which is compatible with the calcium salt of mixed fatty acids.

Based on the discoveries of the present inventors, the present invention provides a feedstuff for ruminants which comprises active substances such as amino acids, salts of amino acids and vitamins dispersed in a protective material of calcium salts of fatty acids. The feedstuff is in granular or pellet form which has a void ratio of not more than 15% and a moisture content of not more than 2% by weight. It was discovered that for practice of the invention it was important that the calcium salts of mixed fatty acids be amorphous in form.

In general, the active substance of the present invention may be any substance which shows activities in the accelerated growth of the ruminant, in improvement of milk quality, in increased milk production, in improvement of hair quality, in prevention of disease and in treatment of disease when the active substance is administered to ruminants.

For example, active substances which may be used in the present invention include amino acids such as methionine, lysine, and tryptophan; N-acylamino acids such as the calcium salts of N-stearoylmethionine, N-oleylmethonine, N-hydroxymethylmethionine; acids of amino acids such as lysine monohydrochloride; hydroxy homologues of amino acids such as 2-hydroxy-4-methylmercaptobutylic acid and the calcium salts thereof; vitamins such as vitamin A, vitamin A-acetate, vitamin A-palmitate, vitamin $D_3$, vitamin E, nicotinic acid and nicotinamide, calcium pantothenate, β-carotene; enzymes such as acidic proteases; carbohydrates such as glucose; drugs for animals such as antibiotics, e.g., penicillins, tetracyclines and anthelmintics such as NEGFONE®; and combinations thereof may be used. In particular, amino acids, salts of amino acids and vitamins are most frequently used as active substances during the growing process of ruminants and, therefore, are preferable for use in the present invention.

The calcium salts of mixed fatty acids as used in the present invention are the calcium salts obtained from naturally occurring fats and oils. The calcium salts of mixed fatty acids with a melting point of 30°–50° C. are preferred. The calcium salts of saturated and/or unsaturated mixed fatty acids having from 6 to 18 carbons are distinctly preferred. Examples of preferred fatty acids include at least one of the acids such as; maleic acid, linolenic acid and linoleic acid.

The calcium salts of mixed fatty acids according to the present invention preferably has a free $Ca(OH)_2$ content of 5% by weight or less. The magnesium salts of mixed fatty acids can also be used.

As stated, according to the present invention, the protective material for the active substance in the feedstuff are the calcium salts of mixed fatty acids. The protective material, preferably, will be the calcium salts of mixed fatty acids and an added hydrophobic substance which is compatible with the calcium salts of mixed fatty acids. The hydrophobic substance is insoluble under neutral and alkaline conditions but may be soluble under acidic conditions. Other additives to the protective material include specific gravity modifies and binders. Preferably, the protective material will have a softening point of 60° C. or more, and more preferably, a softening point of 80° C. or more.

The hydrophobic substance, is added for control of the crystallizability of the calcium salts of mixed fatty acids in the preparation step. It is also added as an aid in the compaction of the feedstuff. The hydrophobic substances useful in the present invention are saturated or unsaturated fatty acids, straight or branched chains, having 8–24 carbon atoms such as 12-hydroxystearic acid, monoglycerides of the fatty acids, and higher alcohols.

The feedstuff for ruminants, as described, may also contain other substances which aid digestion in the abomasum and aid disintegration of the feedstuff in the absorptive organs of the ruminant. The other substances are soluble under the acidic conditions of the abomasum and may be chitosan, polyvinyl acetal diethylacetate (AEA) and other amino-group-containing compounds.

The specific gravity modifier is added during the preparation of the feedstuff for adjustment of the specific gravity to be nearly equal to the specific gravity of the gastric juices in the rumen of the ruminant, so that the feedstuff is not retained in the rumen. Examples of suitable specific gravity modifiers include inorganic fillers such as calcium carbonate and talc.

Binders may also be added to aid in the forming properties of the feedstuff during preparation. Suitable binders include fats and oils, hardened animal and plant oils, waxes and ethyl cellulose.

The feedstuff of the present invention comprises 5%–50% by weight, preferably 10%–40% by weight of an active substance dispersed into 95%–50% by weight, preferably 90%–60% by weight of a protective material. The feedstuff is granular with a particle size of from 0.2–5 mm, has a void ratio of 15% or less with a moisture content of 2% by weight or less. It is essential that the calcium salts of mixed fatty acids have a substantially amorphous structure. Because the calcium salts of mixed fatty acids are usually crystalline, the salts must be heated to a temperature of at least 130° C. and then quenched to obtain the amorphous structure.

The determination of whether the calcium salts in the sample obtained are substantially amorphous or not can be determined by the peak strength of X-ray diffraction of the sample. The peak strength of the calcium salts of fatty acids in the sample should be 40% or less than that of the calcium salts of fatty acids having a crystalline structure.

The void ratio of the feedstuff preparation of the present invention is defined as the value calculated from the difference between a theoretical or true specific gravity (T) and the measure or apparent specific gravity of the preparation. More particularly, (T) is defined as the true specific gravity of each raw material of the preparation and the component ratio thereof. The void ratio is calculated as [(true specific gravity of the preparation minus the measured or apparent specific gravity of the preparation) divided by the true specific gravity of the preparation multiplied by 100]. According to the present invention, the void ratio of the feedstuff must be 15% or less. In order to obtain the required void ratio, known degas techniques may be used.

The moisture content of the feedstuff of the present invention is the moisture content of the divalent metallic salts of fatty acids excluding the crystal water of the salts. The determination of moisture content was made by preparing two sets of sample material. One set was prepared by grinding the prepared granular feedstuff to a particle size of 100 mesh or less, and another set was prepared by washing with anhydrous ethanol and acetone, then dried to a constant weight with the removal of adhesive water using silica gel at room temperature under a pressure of 10 to 30 mm Hg. The moisture content is a value calculated from the difference between the total moisture content and the crystal water of each set of samples measured by means of loss on the drying method and a differential thermal analysis respectively according to the following conditions:

(a) Loss or drying method:
   Sample amount—5 g
   drying conditions—110° C. for 24 hours
(b) Differential thermal analysis:
   sample amount—30 g
   rate of temperature
   rise—10° C. per minute
   highest temperature
   attained—180° C.
   control standard
   substance—aluminum oxide The feedstuff for ruminants of the present invention is prepared by heating the mixture of raw materials or components to a temperature above the softening point of the calcium salt of fatty acids for a time sufficient for degas and then solidified by quenching for granulation.

More particularly, in an extruding molder having degas nozzles each of the raw materials for preparation of the feedstuff is mixed and heated to a temperature of not less than 130° C., preferably to a temperature of 150°–170° C. under a vacuum of not more than 200 Torr, preferably not more than 100 Torr for degas. The mixture is pressurized and extruded as a specified dimension of strands. The extruded strands are quenched, preferably force-dried by water spraying or by dipping into water. After the quench, the strands are cut to a specified dimension to obtain a granular form of feedstuff.

When the heating temperature is too low, and when the cooling rate is too slow, the calcium salts of the mixed fatty acids obtained in the preparation are not satisfactory because the calcium salts of the mixed fatty acids are in crystalline form. When the degas is not sufficient, the moisture content and the void ratio of the preparation are undesirably high for the practice of this invention.

The void ratio is an index showing the compatibility of the protective material for bypassing the rumen by the feedstuff. If the void ratio is too high, there is insufficient protection for the active substance so that when the preparation or feedstuff is orally administered to a ruminant, the rumen bypassing properties of the feedstuff are adversely affected. Therefore, in the practice of this invention, it is required that the void ratio of the preparation be 15% or less.

The presence of moisture in the feedstuff orally administered to ruminants, e.g. adhesive water, causes the elution of the active substance into the rumen; i.e., the active substance is eluted into the moisture. Therefore, in the practice of this invention, it is required that the moisture content be limited to no more than 2% by weight.

In addition, the crystallizability of the calcium salts of mixed fatty acids in the feedstuff influences the elution properties of the active substance into the rumen and the absorption properties of the active substance in the abomasum and intestine. It was discovered that the higher crystallizability the lower the bypassing properties of the active substance in the rumen, i.e., insufficient quantities of the active substance bypassed. Therefore, in the practice of this invention, it is required that the calcium salts of the fatty acids be amorphous in structure.

The free metallic hydroxide, i.e. $Ca(OH)_2$, in the calcium salts of mixed fatty acids tends to neutralize the gastric juices in the abomasum. Thus, the free metallic hydroxide inhibits the disintegration and digestion of the feedstuff in the abomasum and intestine. Therefore, in the practice of this invention, the free metallic hydroxide in the divalent metallic salt of mixed fatty acids is preferably no more than 5% by weight.

The protective material, in combination with a hydrophobic substance, will provide control of the crystallization of the calcium salts and control the compaction of the protective material. The bypass properties of the feedstuff in the rumen are improved by such control. However, if too much hydrophobic substance is added, the softening point of the preparation is undesirably lowered. It is preferable, therefore, that the hydrophobic substance be from 1%–15% by weight of the preparation, preferably 1%–10% by weight.

DESCRIPTION OF THE PREFERRED EMBODIMENT(S)

Preparation of feedstuff samples of the invention and for comparison purposes:

A mixture is prepared containing a specified amount of an active substance, calcium salts of mixed fatty acids, and, if desired, a hydrophobic substance. This mixture was extruded in strands of 2–3 mm diameter using an extruding mold having degas nozzles and attached to a vacuum pump. After extrusion, the strands are cut into 2–3 mm lengths. The strands were used to prepare preparations of the present invention such as samples MA-1 to MA-10 (preparations containing methionine), LA-1 to LA-3 (preparations containing lysine monohydrochloride, NA-1 (preparation containing nicotinamide) and VA-1 (preparation containing vitamin D; and to prepare comparison samples such as MC-1 to MC-3 (preparations containing methionine) and LC-1 to LC-3 (preparations containing lysine monohydrochloride).

The calcium salts of mixed fatty acids used for preparation of the samples had the following characteristics:

(a) Composition of mixed fatty acids

| carbon number | C14 | C16 | C18 | C18' | C18" | C20 |
|---|---|---|---|---|---|---|
| wt % | 2 | 38 | 17 | 35 | 6 | 1 |

(b) Softening point of mixed fatty acids: 43° C.

(c) Free $Ca(OH)_2$ content: 5% by weight.

As a comparison sample, methionine as the active substance and beef tallow hardened oil were mixed and chitosan was added thereto and the mixture heated. The resulting liquid was subjected to spray-granulation to obtain a round particle preparation of beef tallow hardened oil with an average particle diameter of 1 mm. This is Sample No. CC-1.

The compositions, manufacturing conditions, characteristics of preparation and crystallizability are summarized in Table 1.

The following test procedures are applicable to the data in Table 1:

(d) Void ratio is calculated as [(true specific gravity of the preparation—measured or apparent specific gravity of the preparation)/true specific gravity of the preparation×100]. As previously stated, the void ratio of the feedstuff preparation of the present invention is defined as the value calculated from the difference between a theoretical or true specific gravity (T) and the measured or apparent specific gravity of the preparation. More particularly, (T) is defined as the true specific gravity of each raw material of the preparation and the component ratio thereof. For example, as shown in Table 1 for sample numbers MA-2 and MC-2 each comprise 30 weight % methionine and 70 weight % salts of fatty acids. The theoretical or true specific gravity of methionine is 1.340 and Ca salts of fatty acids is 1.017. The theoretical or true specific gravity of these compositions (T) is calculated as follows:

$$T = \frac{30}{70/1.017 + 30/1.340} + \frac{70}{70/1.017 + 30/1.340} = 1.096$$

The measured or apparent specific gravity of these compositions are different from each other, namely, the apparent specific gravity of MA-2 is 1.085 and MC-2 is 0.885. The void ratio is calculated as follows:

$$\text{Void ratio of } MA\text{-}2 = \frac{1.096 - 1.085}{1.096} \times 100 = 1\%$$

$$\text{Void ratio of } MC\text{-}2 = \frac{1.096 - 0.885}{1.096} \times 100 = 19\%$$

(e) Moisture content was determined according to loss on drying method (110° C.×24 hr) and differential thermal analysis described above.

(f) As a scale of crystallizability, the percentage of the peak strength in X-ray diffraction of the calcium salts of fatty acids in each sample were compared against the peak strength in X-ray diffraction of a sample which is obtained by heating only the calcium salts of mixed fatty acids then slow-cooling thereof.

Figure 2:
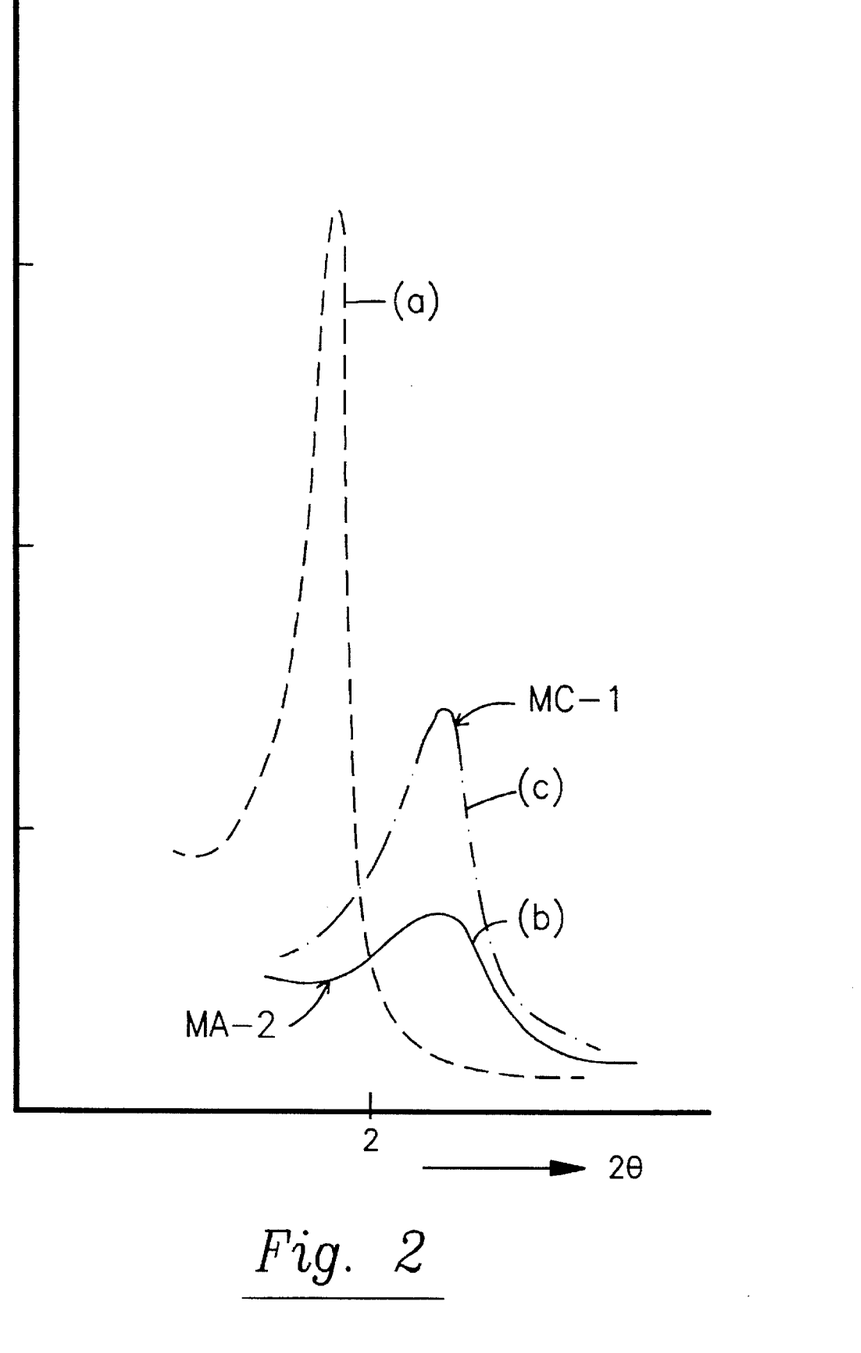
FIG. 2 is an X-ray diffraction pattern for calcium salts of mixed fatty acids of this invention and a pattern for a comparative sample containing methionine as the active substance. Plot (a) is a standard sample obtained by heating at 110° C. only the calcium salts of mixed fatty acids used for sample preparation and then slow cooling thereof. Plot (b) is sample No. MC-2 of the present invention. Plot (c) is a comparative sample, No. MC-1.
Figure 3:
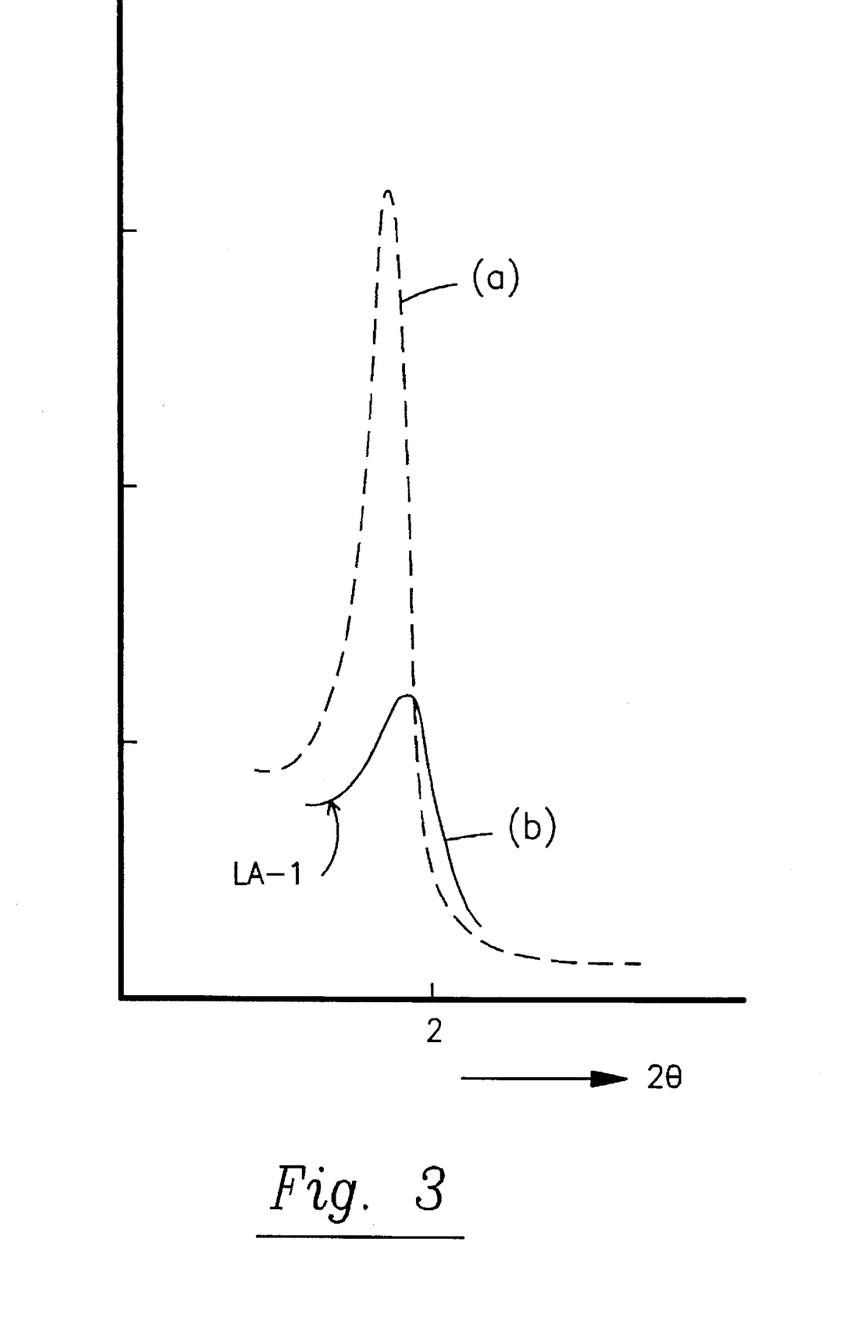
FIG. 3 is an X-ray diffraction pattern of the calcium salts of mixed fatty acids of the sample of the present invention and a comparative sample containing L-lysine monohydrochloride as the active substance. Plot (a) is a standard sample obtained by heating at 110° C. only the calcium salts of mixed fatty acids used for sample preparation and then slow cooling thereof. Plot (b) is sample No. LA-1 of the present invention.
Figure 4:
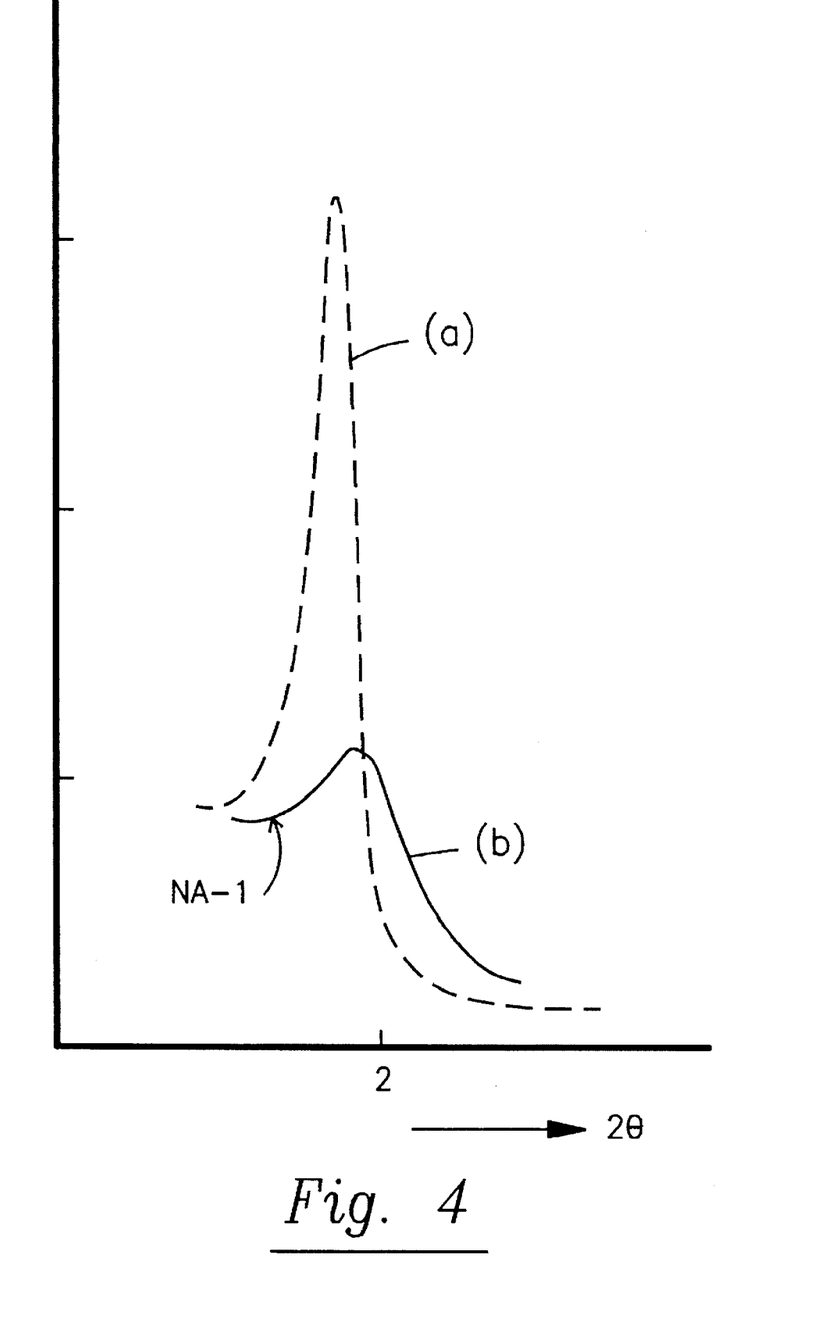
FIG. 4 is an X-ray diffraction pattern of the calcium salts of mixed fatty acids of the sample of the present invention and a comparative sample containing nicotinamide as the active substance. Plot (a) is a standard sample obtained by heating at 110° C. only the calcium salts of mixed fatty acids used for sample preparation and then slow cooling thereof. Plot (b) is sample No. NA-1 of the present invention.

Each component in Table 1 is identified by the following code:

MET: methionine
LYS: L-lysine monohydrochloride
NAA: Nicotinamide
VEA: vitamin E acetate
ST: stearic acid
ML: myristic acid
YA: coconut oil fatty acid
STA: stearyl alcohol
MP: wheat flour
HF: hardened beef tallow
CH: chitosan The X-ray diffraction patterns of the preparations are shown in FIGS. 2, 3 and 4.

TABLE 1

Composition, Preparative Condition and Characters of the Formulation

| Sample No. | Active Substance Kind | Active Substance wt/% | Ca salts of Fatty Acids wt/% | Additives Kind | Additives wt/% | heating temp. °C. | pressure of degas Torr | cooling speed °C./min. | average diameter mm | void ratio % | moisture content % | peak strength % |
|---|---|---|---|---|---|---|---|---|---|---|---|---|
| MA-1 | MET | 20 | 80 | — | 0 | 155 | 30 | 40 | 2 | 1.1 | 1.27 | 23.8 |
| MA-2 | MET | 30 | 70 | — | 0 | 160 | 30 | 40 | 2 | 1.0 | 1.02 | 22.5 |
| MA-3 | MET | 40 | 60 | — | 0 | 170 | 30 | 40 | 2 | 1.6 | 1.48 | 23.0 |
| MA-4 | MET | 30 | 65 | ST | 5 | 155 | 30 | 40 | 2 | 1.8 | 1.21 | 22.0 |
| MA-5 | MET | 30 | 65 | YA | 5 | 155 | 30 | 40 | 2 | 1.1 | 1.24 | 20.3 |
| MA-6 | MET | 40 | 58 | STA | 2 | 165 | 30 | 40 | 2 | 1.3 | 1.55 | 21.8 |
| MA-7 | MET | 40 | 58 | ML | 2 | 165 | 30 | 40 | 2 | 1.6 | 1.36 | 22.0 |
| MA-8 | MET | 30 | 60 | ST/MP | 5/5 | 155 | 30 | 40 | 2 | 1.6 | 1.53 | 21.5 |
| MA-9 | MET | 20 | 80 | — | 0 | 155 | 100 | 40 | 2 | 7.5 | 1.83 | 30.0 |
| MA-10 | MET | 30 | 70 | — | 0 | 160 | 100 | 40 | 2 | 12.3 | 1.90 | 33.3 |
| LA-1 | LYS | 20 | 80 | — | 0 | 160 | 30 | 40 | 2 | 1.4 | 1.47 | 35.5 |
| LA-2 | LYS | 25 | 75 | — | 0 | 160 | 30 | 40 | 2 | 1.5 | 1.03 | 35.0 |
| LA-3 | LYS | 25 | 70 | HF | 5 | 160 | 30 | 40 | 2 | 1.8 | 1.78 | 32.3 |
| NA-1 | NAA | 25 | 75 | — | 0 | 150 | 30 | 40 | 2 | 1.8 | 1.09 | 37.5 |
| VA-1 | VEA | 20 | 80 | — | 0 | 150 | 30 | 40 | 2 | 1.4 | 1.62 | 23.0 |
| MC-1 | MET | 30 | 70 | — | 0 | 120 | 30 | 40 | 2 | 0.9 | 2.25 | 45.0 |
| MC-2 | MET | 30 | 70 | — | 0 | 160 | — | 40 | 2 | 22.0 | 2.13 | 28.7 |
| MC-3 | MET | 30 | 70 | — | 0 | 145 | 500 | 40 | 2 | 16.9 | 1.85 | 39.5 |
| LC-1 | LYS | 25 | 75 | — | 0 | 155 | — | 40 | 2 | 19.3 | 2.27 | 36.0 |
| LC-2 | LYS | 25 | 75 | — | 0 | 160 | 300 | 40 | 2 | 13.5 | 2.11 | 35.3 |
| LC-3 | LYS | 25 | 75 | — | 0 | 170 | 500 | 40 | 2 | 17.3 | 1.86 | 32.8 |
| CC-1 | MET | 27 | — | HF/CH | 68/5 | 80 | 30 | 50 | 1 | 0.5 | 0.01 | — |

Evaluation of the feedstuff samples:

The elution test:

Each of the samples (2 g) prepared as described, were dipped in 200 ml of tris buffer solution corresponding to the gastric juice in the rumen and kept under agitation at a temperature of 37° C. for 24 hours. The samples were removed from the buffer solution and dipped in 200 ml of 0.05M (=mol.dm-3) hydrochloric acid corresponding to the gastric juice in the abomasum and kept under agitation at a temperature of 37° C. for 4 hours. The samples were removed from the 0.05M hydrochloric acid and dipped in 200 ml solution corresponding to that in the small intestines of the ruminant and kept under agitation at a temperature of 37° C. for 4 hours. The tris buffer solution has a pH 8 prepared by dissolving 6.06 g of tris (hydroxymethyl) aminomethane in 0.1M hydrochloric acid and diluted to 1000 ml with water.

The degree of elution was calculated by the measurement of the amount of biologically active substance eluted into the corresponding solution according to the following methods:

| Active Substance | Method of Determination |
|---|---|
| lysine | ninhydrin colorimetry |
| methionine | iodimetry |
| vitamins | high speed liquid chromatography |

The results of elution evaluation for the test samples is shown in Table 2.

TABLE 2

Elution Properties of the Active Substances

| No. | Sample No. | Corresponding Solution (Tr) to Rumen (%) | Corresponding Solution (CL) to Abomasum (%) | Corresponding solution to small Intestine (Lipase) (%) |
|---|---|---|---|---|
| Sample in the invention | | | | |
| a-1 | MA-1 | 13.5 | 65.9 | 11.8 |
| a-2 | MA-2 | 19.9 | 52.5 | 21.4 |

TABLE 2-continued

Elution Properties of the Active Substances

| No. | Sample No. | Corresponding Solution (Tr) to Rumen (%) | Corresponding Solution (CL) to Abomasum (%) | Corresponding solution to small Intestine (Lipase) (%) |
|---|---|---|---|---|
| a-3 | MA-3 | 23.8 | 53.9 | 12.9 |
| a-4 | MA-4 | 13.5 | 58.1 | 18.4 |
| a-5 | MA-5 | 10.2 | 56.1 | 24.0 |
| a-6 | MA-6 | 13.4 | 56.6 | 18.2 |
| a-7 | MA-7 | 18.4 | 58.0 | 18.1 |
| a-8 | HA-8 | 16.5 | 69.5 | 9.4 |
| a-9 | MA-9 | 15.9 | 55.5 | 14.7 |
| a-10 | MA-10 | 25.3 | 58.6 | 10.4 |
| a-11 | LA-1 | 29.3 | 53.4 | 10.4 |
| a-12 | LA-2 | 34.6 | 54.1 | 3.7 |
| a-13 | LA-3 | 27.1 | 57.8 | 4.4 |
| a-14 | NA-1 | 18.8 | 44.5 | 27.0 |
| a-15 | VA-1 | 5.9 | 75.0 | 15.6 |
| References | | | | |
| ca-1 | MC-1 | 19.4 | 19.2 | 13.3 |
| ca-2 | MC-2 | 59.4 | 11.0 | 8.1 |
| ca-3 | MC-3 | 43.8 | 23.7 | 14.1 |
| ca-4 | LC-1 | 27.3 | 14.8 | 12.4 |
| ca-5 | LC-2 | 52.6 | 29.4 | 10.9 |
| ca-6 | LC-3 | 60.9 | 23.7 | 8.3 |
| ca-7 | CC-1 | 19.7 | 55.3 | 21.1 |

Figure 1:
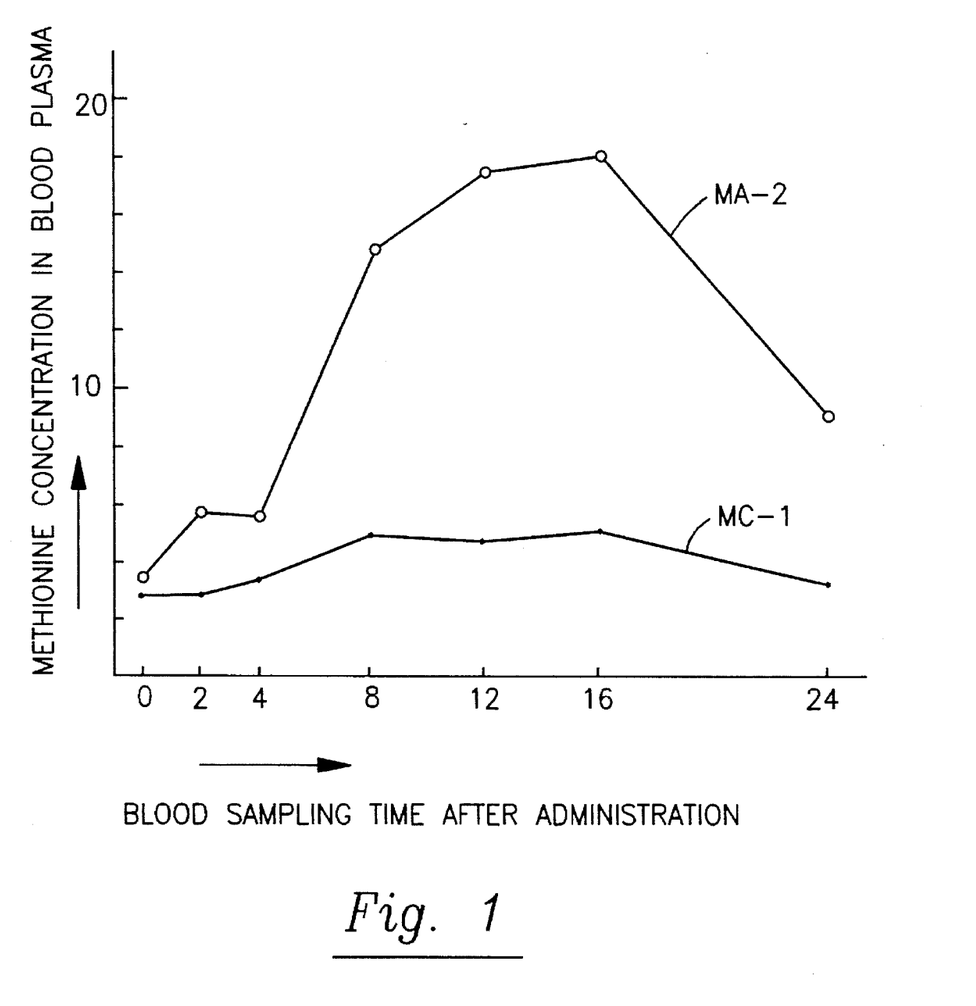
FIG. 1 is a plot of blood concentration for an active substance. The ordinate axis is the blood concentration in mol/blood plasma of active substance methionine. The abscissa axis is the blood collection time after feeding in hours. Plot (a) is sample, No. MA-2 of the present invention and plot (b) is a comparative sample, No. MC-1. Method measurement: at the time of feeding, feed concentrate comprising 100 g of methionine mixed therein was given to a test cow (body weight: 335 kg).

The blood migration test:

The prepared samples and the comparative samples prepared as described were each combined with concentrated feed and given to a test cow (body weight, 335 kg) and the blood concentration of the active substance in the blood of the cow was determined after administrating the feed and sample to the cow. The unit of the active ingredient for the blood migration test is as follows: for methionine: mol/plasma dl; for L-lysine: lysine mol/total amino acid mol (%). The results thereof are shown in Table 3 and graphically depicted in FIG. 1.

As shown from the data in Table 2, the inventive preparations of feedstuffs for ruminants have excellent rumen bypass properties. The feedstuff has excellent water solubility. Even L-lysine monohydrochloride which is difficult to bypass the rumen (refer to example a-11 to a-13), can be effectively digested and absorbed at least 50% by a ruminant. The data shown in Table 3 give further proof of the advantages of the present invention in providing a feedstuff with excellent rumen bypass properties.

TABLE 3

Concentration of Active Component in Blood

| | | Dose | | Time Lapse | | | | | | |
|---|---|---|---|---|---|---|---|---|---|---|
| | | | Active | after administration (hour) | | | | | | |
| No | Samp No. | Preparation | Compd | 0 | 2 | 4 | 8 | 12 | 16 | 24 |
| *1 b-1 | MA-2 | 100 | 30 | 3.5 | 5.7 | 5.6 | 14.8 | 17.6 | 18.2 | 8.9 |
| b-2 | MA-3 | 75 | 30 | 3.5 | — | — | 11.6 | 10.0 | — | 6.3 |
| b-3 | MA-6 | 75 | 30 | 3.7 | — | — | 10.9 | 15.3 | — | 7.6 |
| b-4 | LA-2 | 120 | 30 | 6.7 | — | — | 7.3 | 10.7 | — | 8.3 |
| *2 bc-1 | MC-1 | 100 | 30 | 2.9 | 2.9 | 3.4 | 4.9 | 4.7 | 5.0 | 3.2 |
| bc-2 | LC-1 | 120 | 30 | 6.5 | — | — | 5.8 | 5.3 | — | 6.8 |

The heat stability test:

Sample MA-1 and comparative sample CC-1 were subjected to heat stability test by exposing each sample to two heat exposures: one at 50° C. for 10 days and one at 60° C. for 10 days. Sample appearance after the exposure to heat was visually observed. Sample MA-1 and CC-1 were each combined with concentrated feed and pelleted at 80° C. Sample appearance after pelleting was visually observed. The results of this heat stability test are shown in Table 4.

As shown in Table 4, the feedstuff of the present invention has excellent heat stability compared with the heat stability of the comparative sample comprising conventional hardened oil as the protective substance.

TABLE 4

Heat Resistant Stability of Preparation

| | | Preservation Stability | | Pelletizing |
|---|---|---|---|---|
| No. | Sample No. | 50° C. × 10 days | 60° C. × 10 days | test 80° C. |
| Examples in the invention | MA-1 | not changed | not changed | broken slightly |
| Comparative references | CC-1 | concreted | melted | melted |

Comparison tests on prior art samples:

A ruminant feedstuff was prepared according to the description in U.S. Pat. No. 4,826,694 (McAskie). The following materials were used in the preparation:

| Code | Material |
|---|---|
| FA | Mixed fatty acids of palmitic acid: 46% (wt.) oleic acid: 47% (wt.) stearic acid: 7% (wt.) |
| TG | Triglyceride of beef tallow (m.p. 45° C.) |
| CO | Calcium oxide, chemical grade 150 mesh pass |
| MHA | DL-methionine hydroxy analogue, calcium salt 2-hydroxy-4-methyl-mercaptobutylic acid |
| Water | Ion exchanged water |

Comparative samples of feedstuff preparations of McAskie were prepared as follows:

Sample 2-1-1:

A mixture (code: FT) was prepared by melting and mixing at 100° C. materials FA and TG in the ratio of FA:TG=75:25 parts by weight.

140 g of FT was placed in a one liter beaker and heated to 100° C.; then, 20g of CO was added and mixed with the FT to obtain a suspension. The suspension at the time was 75° C. 25 g water was added to the suspension and mixed by stirring. After about one minute an exothermic reaction was observed: the temperature rose to 101° C. accompanied by foaming. After about 20 minutes, the temperature had decreased to 90° C. at which point the reaction product was removed from the beaker, spread into thin layers for drying.

Sample 2-1-2:

112 g of FT was placed in a one liter beaker and heated to 100° C.; then, 16 g of CO was added and mixed with the FT to obtain a suspension. The suspension at the time was 64° C. 28 g of water was added to the suspension and mixed by stirring. After about one minute an exothermic reaction was observed: the temperature rose to 85° C. after several minutes with no foaming. When the temperature decreased to 70° C. or less, the reaction product was removed from the beaker and spread into thin layers for drying. The reaction product was a sticky substance. After one night, the sticky substance became solid and was made granular by grinding.

Sample 2-2-3:

157 g of FA was placed into a one liter beaker and heated to 100° C.; then 20 g of CO was added and mixed with the FA to obtain a suspension. The suspension at the time was 70° C. 28 g of water was added to the suspension and mixed by stirring. After about ten minutes, an exothermic reaction was observed: the reaction was violent and the reaction product tended to become solid, so stirring was needed to continue the reaction. The resulting reaction product was granules having liquid on their surface. After one night of drying the granules became solid with little liquid on the surface of the granules.

Sample 2-2-4:

105 g of FA was placed into a one liter beaker and heated to 100° C.; then 20 g of CO was added and mixed with the FA to obtain a suspension. The suspension at the time was 60° C. 19 g of water was added to the suspension and mixed by stirring. After about one minute, an exothermic reaction was observed: the temperature rose to 80° C. in several minutes with no foaming. After about 30 minutes, the temperature dropped to 70° C. or less, at which point the reaction product was removed from the beaker and spread into thin layers for drying. The reaction product was a sticky substance. After one night, the sticky substance became solid and was made granular by grinding.

The materials used for preparing Samples 2-1-1, 2-1-2, 2-2-3, and 2-2-4, were further used in the method embodiment of this invention in that stirring was completed within one minute and reacted to a thin layer state. In each further test, except for 2-2-3, the temperature dropped rapidly, i.e., no evolution of heat took place, resulting in a cold solid substance. The experiment using the materials of Sample 2-2-3, a sedimentation or phase separation took place with the water and CaO in the top layer and a solid reaction product in the lower layer. It was evident no reaction took place in the upper layer even to produce an inferior reaction product.

Samples 2-1-1, 2-1-2, 2-2-3, and 2-2-4 were subjected to X-ray diffraction measurement. The data showed a peak near 45 angstrom indicating a crystal lattice of long spacing which corresponds to long direction distance of the calcium salts of fatty acids. Sample 2-2-3 is the calcium salts of fatty acids and shows crystallizability. For Sample 2-2-4 which is the calcium salt of fatty acids comprising MHA, the X-ray diffraction data indicates mixed crystallizability. A composition containing triglyceride has a low level of crystallization.

The results of the experiments on Samples 2-1-1, 2-1-2, 2-3, 2-2-4 are shown in Tables 5, 6 and 7.

TABLE 5

| | Composition of Preparation | | | | Preparative Condition | | |
|---|---|---|---|---|---|---|---|
| | Active Sabstance | | Protecting Materials | | | | |
| | | | Ca salt of | | | | |
| Sample No. | kind | wt % | fatty acid wt % | Triglyceride wt % | Maximum temp. °C. | Degas | Cooling speed °C./min |
| 2-1-1 | — | — | 78 | 22 | 101 | — | 0.5~2 |
| 2-1-2 | MHA | 27 | 57 | 16 | 85 | — | 0.5~2 |
| 2-2-3 | — | — | 100 | — | 90 | — | 0.5~2 |
| 2-2-4 | MHA | 26 | 74 | — | 80 | — | 0.5~2 |

TABLE 6

| Sample No. | Average diameter mm | Void ratio % | Moisture content % | Peak strengh % | Ca content as CaO wt % |
|---|---|---|---|---|---|
| 2-1-1 | 1.5 | 32.2 | 3.2 | 25.2 | 12.7 |
| 2-1-2 | 1.5 | 33.7 | 3.9 | 15.4 | 14.9 |
| 2-2-3 | 1.5 | 33.1 | 3.4 | 63.4 | 19.7 |
| 2-2-4 | 1.5 | 34.0 | 3.9 | 35.8 | 17.4 |

TABLE 7

| Smaple No. | Corresponding solution(Tr) to rumen (%) | Corresponding solution(Tr) to abomasum(%) | Corresponding solution to Intestine(Lipase) |
|---|---|---|---|
| 2-1-1 | 69.8 | 19.3 | 9.4 |
| 2-1-2 | 61.8 | 17.2 | 8.7 |

It is noted that comparative Samples 2-2-3 and 2-3-4 are compositions that contain no triglycerides. The absence of a triglyceride caused a poor dispersion of water, a slow starting reaction which resulted in a local and violent reaction accompanied by a sedimentation of water and CaO and the incorporation of unreacted material into the solid reaction product. Even for the reactions in the presence of a fine dispersion of water, it was noted that dispersability is improved by the increase in viscosity; however, the temperature rise from the exothermic heat of reaction is not sufficient. Therefore, moisture cannot be removed in the short time described in the McAskie patent, resulting in the need for a long period of drying. In addition, the samples of McAskie, as prepared herein, were crystalline in structure as shown by the X-ray diffraction data.

According to the practice of the present invention the quenching of the reaction product is performed at a temperature of 130° C. or more, preferably from 150° C. to 170° C. On the other hand, a temperature for cooling of only slightly higher than 100° C would be needed to evaporate the water contained in the preparations taught by the McAskie patent.

Figure 5:
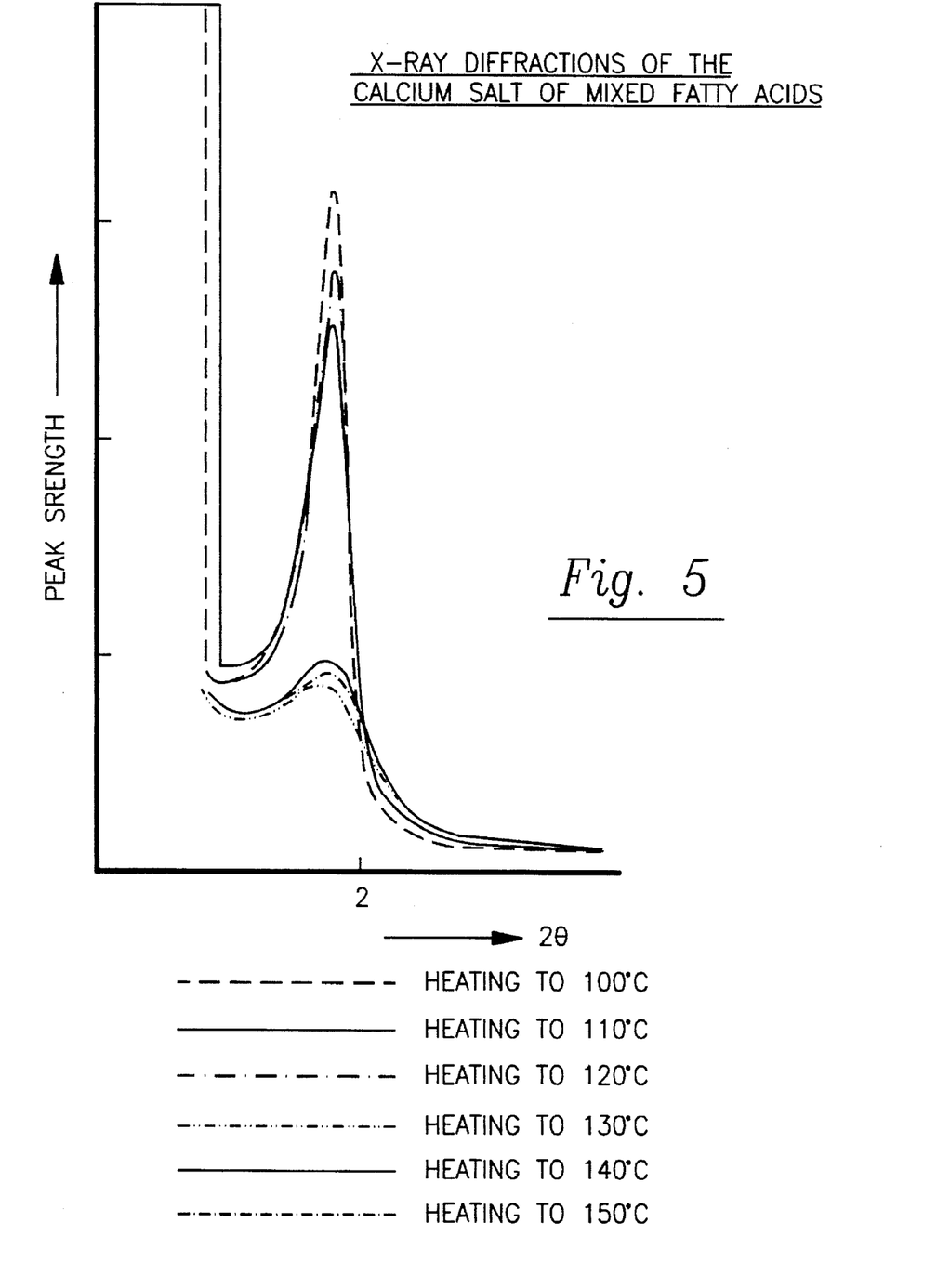
FIG. 5 is the X-ray diffraction patterns for the calcium salts of mixed fatty acids which were heated to 130° C.–150° C. and then rapidly cooled.

In the prior art reference of *J. Colloid Sci.*, 3, 339 (1948), it is stated that the crystallizability of the calcium salts of fatty acids decreases at a temperature of 130° C. or more. As shown in FIG. 5 of the present invention, it is shown that heating to 130° C. or more is needed to obtain calcium salts of mixed fatty acids having an amorphous structure. The object of quenching, according to the inventors, is to prevent crystallization of the calcium salts of fatty acids. Cooling or quenching at a temperature of about 100° will not prevent crystallization of the salts and, therefore, is meaningless with respect to the crystallization of the salts. In a practical sense, cooling by air cooling of the calcium salts is unsuitable due to the long period of time needed for the cooling. In the present invention, quenching of the calcium salts is conducted in a very short period of time.

The feedstuff for ruminants containing the protective material of the present invention, as shown by the data presented, has greatly improved heat stability and has an excellent balance between the bypassing properties for the active substance in the rumen and the digestive/absorption properties of the active substance in the abomasum and the intestines of the ruminant.

Therefore, in the practice of the present invention, it is expected that, for ruminant growth acceleration, disease prevention during the period of parturition and lactation, milk production increase, milk quality improvement, and hair quality improvement will be attained by the addition of the preparations of the present invention to feedstuffs and the administration of the resulting feedstuffs to ruminants such as cattle and sheep.

The present invention is intended to provide feedstuffs for ruminants which are orally administered to the ruminant and can bypass the rumen and be digested and absorbed effectively in the abomasum and intestines. The inventive preparations have industrial significance, especially in the field of livestock production.

What is claimed:

1. A ruminant feedstuff comprising an effective amount of a biologically active substance dispersed in a protectant wherein said protectant contains a bi-valent amorphous metal salt of mixed fatty acids and wherein said feedstuff has a void ratio from 1% to 15% and a moisture content not to exceed 2% by weight.

2. The ruminant feedstuff according to claim 1 wherein the biologically active substance is selected from the group consisting of amino acids, hydroxy homologues of amino acids, vitamins, enzymes, carbohydrates, and veterinary medicines.

3. The ruminant feedstuff according to claim 1 wherein the biologically active substance is a vitamin selected from the group consisting of vitamin A, vitamin $D_3$, vitamin E, nicotinic acid and beta-carotene.

4. The ruminant feedstuff according to claim 1 wherein the mixed fatty acids are natural fats or oils with a melting point from 30° C.–50° C.

5. The ruminant feedstuff according to claim 1 wherein the bi-valent amorphous metal salt of mixed fatty acids is a calcium salt.

6. The ruminant feedstuff according to claim 5 wherein the bi-valent amorphous metal salt of fatty acids comprises said calcium salt wherein a free $Ca(OH)_2$ content in said Ca salt does not exceed 5% by weight.

7. The ruminant feedstuff according to claim 1 wherein the biologically active substance is an amino acid selected from the group consisting of methionine, tryptophan and lysine.

8. A ruminant feedstuff comprising a granulated blend of
   (a) an effective amount of a biologically active substance, and,
   (b) a protectant comprising a bi-valent amorphous metal salt of mixed fatty acids; said granulated blend having a void ratio from 1% to 15% and a moisture content from 1% to 2% by weight.

9. The ruminant feedstuff of claim 8, wherein the biologically active substance is an amino acid and the amorhporus metal salt is a Ca salt.

10. The ruminant feedstuff of claim 9, wherein the amino acid is methionine.

11. The ruminant feedstuff of claim 9, wherein the amino acid is lysine.

12. The ruminant feedstuff of claim 9, wherein the amino acid is tryptophan.

13. A ruminant feedstuff comprising
   (a) an effective amount of a biologically active substance selected from the group consisting of amino acids, amino acid derivatives, hydroxy homologues of amino acids, vitamins, enzymes and veterinary medicines, and
   (b) an amorphorus protectant comprising a bi-valent metal salt of mixed fatty acids wherein the ruminant feedstuff has a void ratio from 1% to 15% and a moisture content not to exceed 2% by weight and is produced by a process comprising the steps of
      (1) dispersing a 5–50 parts by weight of the biologically active substance in a 95–50 parts by weight of the protectant to form a dispersed material, and
      (2) molding the dispersed material to a granular strand having a diameter from 0.2–5 mm.

14. The ruminant feedstuff according to claim 1, further comprising a hydrophobic substance which is mutually soluble with the salt of mixed fatty acids and said hydrophobic substance is selected from the group consisting of saturated or unsaturated fatty acids of 8–24 carbon atoms having straight or branched chains and mixtures thereof.

15. The ruminant feedstuff according to claim 14 wherein the hydrophobic substance is selected from the group consisting of 12-hydroxy-stearic acid, monoglycerides of the fatty acids, and higher alcohols.

16. The ruminant feedstuff of claim 13, wherein the molding comprises the steps of
   (a) heating the dispersed materials of step (1) to a temperature of at least 130° C. with sufficient degas,
   (b) extruding the dispersed materials to a strand having a diameter from 0.5–5 mm,
   (c) rapidly cooling the strand, and,
   (d) cutting the cooled strand into pellets, wherein the pellet has a void ratio from 1 to 15% and a moisture content of less than 2% by weight.

* * * * *